United States Patent [19]

Hatz et al.

[11] 4,142,503
[45] Mar. 6, 1979

[54] SIGNAL INDICATING DEVICE ON INTERNAL COMBUSTION ENGINES

[75] Inventors: Ernst Hatz; Heinz Eibl; Erich Absenger, all of Ruhstorf, Fed. Rep. of Germany

[73] Assignee: Motorenfabrik Hatz GmbH & Co. KG, Ruhstorf, Fed. Rep. of Germany

[21] Appl. No.: 847,034

[22] Filed: Oct. 31, 1977

[30] Foreign Application Priority Data

Nov. 10, 1976 [DE] Fed. Rep. of Germany ....... 2651257

[51] Int. Cl.² .................... F02B 77/08; B01D 46/00; F02M 35/06
[52] U.S. Cl. .............. 123/198 D; 123/41.7; 55/274; 55/DIG. 34; 73/118; 123/198 E
[58] Field of Search .......... 123/198 D, 198 E, 198 R, 123/41.15, 41.56, 41.7; 55/274, DIG. 34; 73/118

[56] References Cited

U.S. PATENT DOCUMENTS

| | | | |
|---|---|---|---|
| 2,798,465 | 7/1957 | Nicholson | 123/41.15 |
| 3,066,527 | 12/1962 | Stein | 123/198 D |
| 3,258,960 | 7/1966 | Baden et al. | 55/274 |
| 3,397,395 | 8/1968 | Pierce | 73/118 |
| 3,443,365 | 5/1969 | Lee et al. | 73/118 X |
| 3,488,928 | 1/1970 | Tarala | 55/274 |
| 3,939,457 | 2/1976 | Nelson | 55/274 |
| 3,949,726 | 4/1976 | List | 123/198 E |
| 3,964,462 | 6/1976 | Thien et al. | 123/198 E |
| 4,033,733 | 7/1977 | Nelson | 55/274 |
| 4,040,295 | 8/1977 | Romann | 73/118 |

FOREIGN PATENT DOCUMENTS

2446734 4/1975 Fed. Rep. of Germany ...... 123/198 D

*Primary Examiner*—Ira S. Lazarus
*Attorney, Agent, or Firm*—Blanchard, Flynn, Thiel, Boutell & Tanis

[57] ABSTRACT

A signal indicating device for an internal combustion engine. The internal combustion engine has a sound absorbing shell surrounding the engine body. An air intake pipe is mounted on the engine and an air intake filter is mounted on the inlet end of the air intake pipe. The signalling device is provided to indicate the degree of contamination of the air filter. The signaling device can be a visual signal or an audible signal.

4 Claims, 3 Drawing Figures

SIGNAL INDICATING DEVICE ON INTERNAL COMBUSTION ENGINES

FIELD OF THE INVENTION

The invention relates to a signal indication device for indicating a certain limit value pertaining to the degree of feeding of air to an internal combustion engine, the engine having a cooling-air blower for moving the cooling air into a storage space which surrounds the engine parts which are to be cooled.

BACKGROUND OF THE INVENTION

Signal indication devices for indicating a certain underpressure in the air intake pipe of the engine are known. In the case of these devices, underpressure in the air intake pipe and the atmospheric pressure are used in the aforementioned control. The variable control magnitude serves here, thus alone, the underpressure in the air intake pipe, which underpressure changes with the level of contamination of the air filter. The thermal conditions on the engine change, however, also as is known with the speed of the engine. The thermal conditions are much more critical in the higher speed range than in the lower speeds. This means that one and the same engine type operated with lower speeds (for example 15 rotations per minute) can take a substantially smaller pressure than in the case of a continuous operation in the high speed range (for example 3000 rotations per minute). Therefore, a signal device of the aforementioned type cannot be adjusted in advance at its place of manufacture to unknown operating conditions. Therefore, this device is adjusted to the underpressure in the air intake pipe which can be expected at a maximum speed of the engine and it is accepted that during continuous operation of this engine at lower speeds a more frequent air filter change must take place.

The purpose of the invention is to provide here a substantial improvement. According to the invention, the signal device includes an operator, preferably a piston, which influences the signaling device and which is loaded on the one side by the pressure in the air intake pipe and on the other side by the pressure in the storage chamber of the engine. With such a design, the pressure in the storage chamber, which pressure changes with the speed, results as second variable control magnitude, which causes the signal device to also consider, aside from the pressure in the air intake pipe, the speed of the engine or to react to the sensitivity of the engine at high speeds.

The preferred embodiment of the invention is characterized by the piston being stored with its cylinder inside of the air filter and surrounding a hollow screw which serves to secure the air filter in place, inside of which hollow screw is arranged a signal rod which is equipped with a signal head. According to a different characteristic of the invention the chamber on one side of the piston is hereby connected to the inner chamber of the filter, while the chamber on the other side of the piston is line-connected to the inside of the hollow screw which terminates in the storage chamber of the engine.

It is furthermore very advantageous in internal combustion engines having a casing which fully surrounds the engine body, to design the signal head in color and to permit it to project in its signaling position from the upper surface of the casing. Monitoring of the device occurs then at a point on the engine which can easily be overseen by the operator.

BRIEF DESCRIPTION OF THE DRAWING

One exemplary embodiment of the invention is discussed more in detail in the following description with reference to the accompanying drawing, in which.

DETAILED DESCRIPTION

Figures 1, 2:
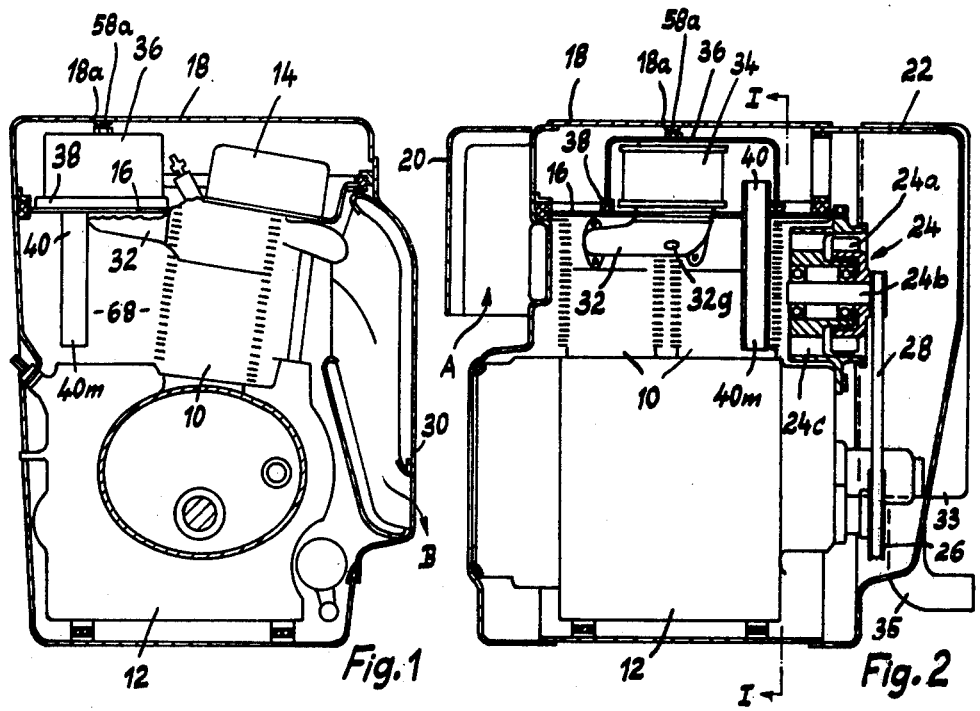
FIG. 1 is a cross-sectional view of an internal combustion engine having casing therearound taken along the line I—I of FIG. 2.
FIG. 2 is a longitudinal cross-sectional view of the casing.
Figure 3:
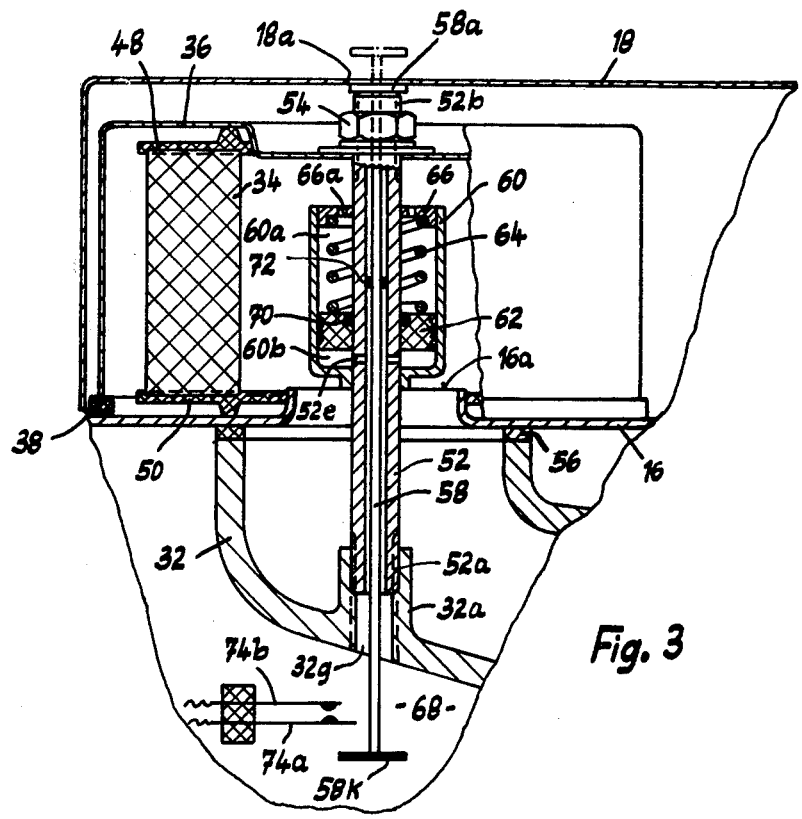
FIG. 3 is an enlarged cross-sectional view of the device for generating signal indication.

The internal combustion engine which is illustrated as the exemplary embodiment is a two-cylindrical injection internal combustion engine having approximately vertically upstanding cylinder housings 10 secured to the crankcase housing 12. A support plate 16 is inserted between the cylinder heads 14 and the cylinder housings 10. Individual elements of the downwardly extending casing are mounted on the support plate 16 as is discussed in more detail for example in U.S. Pat. No. 3,924,597.

A further sound absorbing shell 18 is mounted above the engine and is also releasably secured to the support plate 16. An elbow-type shell 20 is connected to the shell 18 and forms the downwardly opening inlet channel A for the cooling air. A cup-shaped baffle member 22 is mounted on the end of the engine remote from the inlet channel A and receives air from the channel defined by the members 16, 18 and 20 and guides same to a cooling-air blower 24. The impeller blades 24a of the blower are mounted on a shaft 24b which is driven by a drive pulley 26 connected to the engine crankshaft through a belt 28. The drawn-in cooling air is blown over a stationary guide wheel 24c by the blower against the cylinder housings 10 and on into the inside of the lower casing. After flowing around the encased engine body, the used cooling air enters an outlet channel formed by a downwardly open metal shell 30 and leaves the casing as indicated by the arrow (B).

The air for combustion is fed to the two cylinder housings 10 through an air intake elbow 32, while the combustion exhaust gases are fed into an exhaust manifold which extends outside of the casing and which is here surrounded by a special casing 33 which enhances the absorption of sound. The exhaust gases exit from the exhaust manifold to the outside through a pipe 35.

The combustion air is fed to the air intake elbow 32 through an air filter 34 which is covered with a pot-shaped sheet-metal housing 36. This housing is closed off by a ring-shaped seal 38 which is mounted on the support plate 16 so that a chamber is created within the housing 36. A snorkellike pipe 40 extends from the chamber to the inside of the engine casing. The pipe 40 is connected to the support plate 16 in a manner which is not illustrated in detail but the entrance of air into the inside of the housing 36 is accomplished only through the port 40m of the pipe 40.

The air filter 34 consists in a conventional manner of an annular paper filter insert or the like which is inserted between two holding plates 48, 50. To anchor the filter package on the air intake pipe 32, a tightening screw 52 is used and which engages with its threaded end 52a an internally threaded embossment 32a on the air intake pipe 32. A threaded nut 54 is positioned at the other end 52b of the tightening screw 52 and tightens the filter package 34, 48, 50 against a seal 56 which encircles the inlet port of the air intake pipe 32. The air for combustion enters the annular chamber below the cover plate 36 through the pipe 40, passes through the filter insert 34 and enters through the center opening 16a in the support plate 16 into the air intake pipe 32, in order to be fed from here to the inlet valve or valves of the engine.

The tightening screw 52 is hollow in construction. A rod 58 made of plastic material is inserted inside of it and supports at its upper end a vertically reciprocal red colored signal head 58a positioned below an opening 18a in the cover sheet 18 and on the front or upper side of the tightening screw 52, 52b.

An upwardly opening cylinder 60 is secured to and encircles the periphery of the tightening screw 52. A piston 62 is slidable within the cylinder 60. A pressure spring 64 is arranged inside of the cylinder 60 and rests at one end on the one side on a cover plate 66 which closes off the upper end of the cylinder 62. The other end of the spring 64 is supported on or engages the piston 62. Plural openings 66a in the plate 66 create a connection between the inside chamber 60a of the cylinder 60 above the piston 62 and the inside of the filter 34 so that the underpressure within these chambers acts onto the top side of the piston 62. The pressure which exists in the storage chamber 68 within the casing surrounding the engine body acts onto the bottom side of the piston by the following discussed structure. The pressure in this storage chamber 68 depends on the pressure of the cooling-air stream which is conveyed by the blower 24. Since the speed of the blower 24 changes with the speed of the engine, the pressure inside of the storage chamber depends on the engine speed. In order to be able to use this speed-dependent pressure also for controlling the signal device, the chamber 60b below the cylinder 60 is connected by means of cross bores 52e to the inside of the tightening screw 52, which is connected through the threaded opening 32g in the embossment 32a of the air intake pipe 32 to the storage chamber 68 within the casing.

A permanent magnet 70 is positioned on the piston 62 and cooperates with a ring 72 made of metal on the periphery of the rod 58. In order not to influence the carrying along of the ring 72 by the magnet action of the magnet 70, the tightening screw 52 is manufactured of unmagnetizable material, for example plastic or aluminum.

In the rest position of the engine and when the air filter 34 is clean, the parts assume the illustrated position, whereby the signal head 58a lies covered below the upper surface of the cover plate 18. If, however, after a longer time of operation, the filter insert 34 becomes more and more dirty, then the pressure drops also within the filter 34 and also within the chamber 60a. If the speed of the engine rises, then the pressure within the storage chamber 68 and in the chamber 60b increases. Two variable control magnitudes, namely underpressure within the air filter and the dynamic pressure within the engine casing, act onto the piston 62. As soon as these control magnitudes reach a limit value, the piston 62 is moved more and more upwardly, until the permanent magnet 70 becomes magnetically coupled to the ring 72 and then carries the rod 58 upwardly therewith. Thus, in the critical limit value position, the signal head 58a assumes its uppermost, dash-dotted indicated position and projects far out of and above the cover plate 18. The operator can easily over-see from above this signal indication and will clean or exchange the filter insert 34.

Aside from this visual signal indication, it is possible to additionally provide, if desired, an audible warning device. For this purpose, a contact operator member 58k is mounted on the lower end of the rod 58, which contact operator member closes an electrical contact 74a, 74b in a circuit when the rod 58 is in the uppermost position to activate a horn or the like to make the operator acoustically aware of the critical situation.

It must also be mentioned that it is possible for the signal indication to include only an audible warning device. It would also be possible to give the signal indication by stopping the engine, for which purpose for example in the circuit of the contacts 74a, 74b, there would have to be arranged an electro-magnetic operator for stopping the engine.

Furthermore, it is supposed to be stated that in place of the described piston which is movable in the cylinder, it is possible to use also a bellows or the like as an operator of the signal device cooperating together directly or through intermediate members with the signal device.

Finally it must be mentioned that there occurs a pressure differential, namely a small excess pressure, in internal combustion engines which use, contrary to the aforedescribed exemplary embodiment, a turbo charger on the air intake side. The inventive signal device can also be used in such internal combustion engines.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for producing a signal indication of a certain limit value in the degree of feeding air to an internal combustion engine, said engine having a cooling-air blower for moving cooling air into a storage chamber which surrounds the engine body which is to be cooled and into an air intake pipe, the improvement comprising wherein the device includes cylinder means, piston means movable in said cylinder means, movable signal means movable in response to a movement of said piston means, and means for loading said piston means on one side thereof by the pressure in the said air intake pipe and on the other side thereof by the pressure in said storage chamber of the engine.

2. The improved device according to claim 1, wherein said piston means and said cylinder means are located inside of an air filter, said piston surrounding a hollow screw which serves to fasten the air filter to the engine body, said signal means including a signal rod inside of the hollow screw and is equipped with a signal head.

3. The improved device according to claim 2, wherein said chamber on one side of said piston means is connected in fluid circuit to the inside of said air filter, while the chamber on the other side of said piston means is connected in fluid circuit through the inside of the hollow screw to said storage chamber surrounding said engine.

4. The improved device according to claim 2, further including an additional casing member which surrounds the internal combustion engine, the further improvement comprising wherein said signal head is designed in color and projects in its signal indicating position above the upper surface of said additional casing.

* * * * *